(12) United States Patent
Wang et al.

(10) Patent No.: US 12,168,874 B2
(45) Date of Patent: Dec. 17, 2024

(54) ROOFING MEMBRANES COMPRISING PRESSURE-SENSITIVE ADHESIVES AND METHODS OF USING SAME

(71) Applicant: CertainTeed LLC, Malvern, PA (US)

(72) Inventors: Ying Wang, Westborough, MA (US); Eric Dong, Northboro, MA (US); Paul A. Benensky, Collegeville, PA (US); Mark W. Simon, Sutton, MA (US); Abby Feinstein, Malvern, PA (US); Nicky Chan, Hudson, MA (US); Choung-Houng Lai, Acton, MA (US)

(73) Assignee: CERTAINTEED LLC, Malvern, PA (US)

( * ) Notice: Subject to any disclaimer, the term of this patent is extended or adjusted under 35 U.S.C. 154(b) by 0 days.

(21) Appl. No.: 17/543,818

(22) Filed: Dec. 7, 2021

(65) Prior Publication Data

US 2022/0178144 A1 Jun. 9, 2022

Related U.S. Application Data

(60) Provisional application No. 63/122,324, filed on Dec. 7, 2020.

(51) Int. Cl.
*E04D 5/14* (2006.01)
*C09J 7/38* (2018.01)
(Continued)

(52) U.S. Cl.
CPC .............. *E04D 5/148* (2013.01); *C09J 7/385* (2018.01); *C09J 7/40* (2018.01); *E04D 5/06* (2013.01); *E04D 5/143* (2013.01)

(58) Field of Classification Search
CPC ........... E04D 5/148; E04D 5/06; E04D 5/143; E04D 5/142; E04D 5/12; C09J 7/385;
(Continued)

(56) References Cited

U.S. PATENT DOCUMENTS

| | | |
|---|---|---|
| 5,391,015 A | 2/1995 | Kaczmarczik |
| 5,612,141 A | 3/1997 | Davis |

(Continued)

FOREIGN PATENT DOCUMENTS

| | | |
|---|---|---|
| DE | 10146480 A1 | 4/2003 |
| DE | 10230782 A1 | 1/2004 |

(Continued)

OTHER PUBLICATIONS

E.P. Chang, "Viscoelastic Properties of Pressure-Sensitive Adhesives," J. Adhesion, 60, 233-248 (1997).

*Primary Examiner* — Patricia L. Nordmeyer
(74) *Attorney, Agent, or Firm* — Abel Schillinger, LLP; Stephen Eland (57) ABSTRACT

Provided are roofing membranes comprising pressure-sensitive adhesives particularly adapted for use at cold temperature, and methods for using same. In one aspect, the disclosure provides a roofing membrane comprising: a bituminous sheet having a lower bituminous surface and an upper bituminous surface; and a non-bituminous cold-temperature pressure-sensitive adhesive disposed on the lower bituminous surface, the upper bituminous surface, or both, wherein the cold-temperature pressure-sensitive adhesive has an average adhesion of at least 10 lbs/ft (146 N/m) at 2° C. as measured by a two hour T-peel test.

22 Claims, 6 Drawing Sheets

(51) Int. Cl.
*C09J 7/40* (2018.01)
*E04D 5/06* (2006.01)

(58) Field of Classification Search
CPC .. C09J 7/40; C09J 2203/346; C09J 2301/312; C09J 2495/006
See application file for complete search history.

(56) References Cited

U.S. PATENT DOCUMENTS

| | | | |
|---|---|---|---|
| 6,586,080 B1 * | 7/2003 | Heifetz | B32B 11/04 |
| | | | 428/317.1 |
| 6,696,125 B2 | 12/2004 | Zanchetta | |
| 6,924,015 B2 | 8/2005 | Zanchetta | |
| 7,101,598 B2 | 9/2006 | Hubbard | |
| 7,132,143 B2 | 11/2006 | Zanchetta | |
| 7,771,807 B2 | 8/2010 | Hubbard | |
| 7,776,417 B2 | 8/2010 | Mohseen | |
| 8,298,661 B2 | 10/2012 | Samanta | |
| 8,298,662 B2 | 10/2012 | Samanta | |
| 9,212,488 B1 * | 12/2015 | McGraw | E04D 5/148 |
| 9,234,352 B2 | 1/2016 | Olson | |
| 9,528,268 B2 | 12/2016 | Hubbard | |
| 10,065,394 B2 | 9/2018 | Tang | |
| 10,132,082 B2 | 11/2018 | Tang | |
| 10,167,637 B2 | 1/2019 | Hubbard | |
| 10,370,854 B2 | 8/2019 | Tang | |
| 10,519,663 B2 | 12/2019 | Tang | |
| 2003/0219564 A1 | 11/2003 | Hubbard | |
| 2009/0220720 A1 | 9/2009 | Mohseen | |
| 2019/0316359 A1 | 10/2019 | Tang | |

FOREIGN PATENT DOCUMENTS

| | | | |
|---|---|---|---|
| EP | 1941994 A1 | 7/2008 | |
| EP | 3450520 A1 | 3/2019 | |
| EP | 3611308 A1 * | 2/2020 | ............ C09J 7/245 |
| WO | 98/56866 | 12/1998 | |
| WO | 01/96678 A1 | 12/2001 | |
| WO | 2016145188 A1 | 12/2016 | |
| WO | 2018/156591 A1 | 8/2018 | |

* cited by examiner

ROOFING MEMBRANES COMPRISING PRESSURE-SENSITIVE ADHESIVES AND METHODS OF USING SAME

CROSS-REFERENCE TO RELATED APPLICATIONS

The present application claims the benefit of priority of U.S. Provisional Patent Application No. 63/122,324, filed Dec. 7, 2020, which is hereby incorporated herein by reference in its entirety.

BACKGROUND OF THE DISCLOSURE

1. Field of the Disclosure

The present disclosure relates generally to roofing membranes. The present disclosure relates more particularly to roofing membranes comprising a pressure-sensitive adhesive; methods of installing them; and roofing products incorporating same.

2. Technical Background

Asphalt-based roofing membranes are excellent waterproofing materials, and as such are extensively used in low-slope roofing systems to provide during and inexpensive roof covering. Low-slope roofing systems are common in commercial and industrial buildings, as well as larger residential buildings. Typical low-slope roofing systems are built-up roofs, modified bitumen roofs, and single-ply or membrane roofing systems. Asphalt-based roofing membranes are frequently used as waterproofing underlayment in low-rise structures, as well as the uppermost or finish layer for built-up roofs. Built-up roofs are then sometimes covered with a layer of gravel to protect the roofing membrane from mechanical damage and to shield the membrane from solar radiation.

In conventional roofing systems, a lower bituminous surface of the membrane adheres to the roofing substrate (e.g., roof deck or a base sheet disposed thereon) to provide good adhesion. But conventional asphalt-based roofing membranes require a certain minimum temperature for installation. This is due to the fact that bituminous materials (e.g., asphalt, optionally modified with a polymer like so-called "SBS," a styrene/butadiene/styrene block copolymer) have lower adhesive properties at cold temperatures. Especially in northern climates, this can restrict the months where certain roofing products may be applied, causing construction and distribution bottlenecks. Such conventional roofing membranes can be applied at cold temperatures using external heating equipment. However, this increases the equipment required for roofing installation and slows down installation, increasing the cost and complexity of roofing installation.

Accordingly, there exists a need for improved roofing membranes which may be applied at cold temperatures with adequate adhesion without the use of external heating.

SUMMARY OF THE DISCLOSURE

In one aspect, the present disclosure provides for a roofing membrane product comprising:
a bituminous sheet having a lower bituminous surface and an upper bituminous surface; and
a cold-temperature pressure-sensitive adhesive disposed on the lower bituminous surface, the upper bituminous surface, or both, wherein the roofing membrane has an average adhesion at the cold-temperature pressure-sensitive adhesive of at least 8 lbs/ft (117 N/m) at 2° C. as measured by a two-hour T-peel test.

In another aspect, the present disclosure provides for a roof comprising a roofing membrane as otherwise described herein bonded to a substrate (e.g., a roof deck a roofing base sheet, or another roofing membrane) via the pressure-sensitive adhesive.

In another aspect, the present disclosure provides for a method of installing a roofing membrane, the method comprising:
providing a first roofing membrane (e.g., the roofing membrane as described herein); and
and adhering the first roofing membrane to substrate (e.g., roof deck, or a roofing base sheet, or another roofing membrane) or a superstrate (e.g., another roofing membrane) via the pressure-sensitive adhesive.

In another aspect, the present disclosure provides for a method of installing a roofing system, the method comprising:
providing a bituminous sheet having an upper surface and a lower surface, at least one of the upper and lower surfaces being bituminous;
affixing a first surface of a cold-temperature pressure-sensitive adhesive (e.g., as described herein) to a bituminous surface of the roofing membrane such that an opposed second surface of the cold-temperature pressure-sensitive adhesive remains exposable, thereby providing a roofing membrane having an average adhesion at the cold-temperature pressure-sensitive adhesive of at least 8 lbs/ft (117 N/m) at 2° C. as measured by a two-hour T-peel test; and
adhering the roofing membrane to a substrate (e.g., a roof deck, a base sheet, or another roofing membrane) or a superstrate (e.g., another roofing membrane) via the second surface of the cold-temperature pressure-sensitive adhesive.

In another aspect, the present disclosure provides for a method of installing a roofing system, the method comprising:
providing a bituminous sheet having an upper surface and a lower surface, at least one of the upper and lower surfaces being bituminous;
providing a cold-temperature pressure-sensitive adhesive (e.g., as described herein) having a first surface an opposed second surface;
affixing a second surface of the cold-temperature pressure-sensitive adhesive to a substrate (e.g., a roof deck, a roofing base sheet, or a roofing membrane) or a superstrate (e.g., another roofing membrane), such that an opposed first surface of the cold-temperature pressure-sensitive adhesive remains exposable; and
adhering the first surface of the cold-temperature pressure-sensitive adhesive to a bituminous surface of the bituminous sheet, to provide a roofing membrane having an average adhesion at the cold-temperature pressure-sensitive adhesive of at least 8 lbs/ft (117 N/m) at 2° C. as measured by a two-hour T-peel test.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings illustrate one or more embodiment(s) of the disclosure, and together with the description serve to explain the principles and operation of the disclosure.

DETAILED DESCRIPTION

The present inventors have noted that conventional roofing membranes possess poor performance at cold temperatures. One reason for this is that most roofing products rely on bitumen to act as a pressure-sensitive adhesive to adhere the membrane to the underlying substrate. However, this only functions at temperatures sufficient to soften the bitumen enough to allow it to bind to the substrate. As temperatures lower, the adhesive strength of bitumen drops precipitously. Especially in northern climates, this significantly restricts the months where roofing membranes may be applied. To remedy this shortcoming, conventional approaches dictate the use of a heat source, such as a heat gun, to produce a local temperature high enough for appropriate adhesion. However, the extra heating step is burdensome, as it requires extra equipment, cost, and risks associated with a heat source along with the extra time required to place and heat the membrane.

As an alternative approach, the present inventors have developed methods and compositions utilizing a cold-temperature pressure-sensitive adhesive for use on the roofing membrane. Advantageously, the pressure-sensitive adhesive exhibits high adhesion even at cold temperature. This allows strong adhesion during the installation step. In certain embodiments, when the weather warms the bitumen may provide additional adhesive strength. Use of cold-temperature pressure-sensitive adhesives thus allow installation at cold temperatures without the use of an external heat source.

Accordingly, in one aspect, the present disclosure provides for a roofing membrane comprising:
 a bituminous sheet having a lower surface and an upper surface, at least one of the upper and lower surfaces being bituminous;
 a non-bituminous cold-temperature pressure-sensitive adhesive disposed on a lower bituminous surface, a upper bituminous surface, or both, wherein the cold-temperature pressure-sensitive adhesive has an average adhesion of at least 8 lbs/ft (117 N/m) at 2° C. as measured by a two-hour T-peel test.

Figure 1:
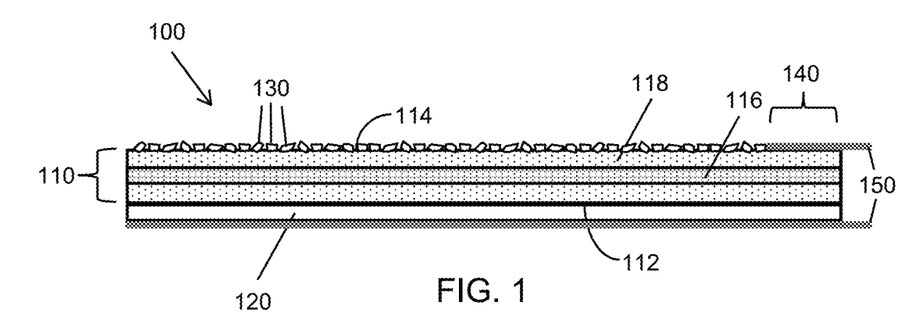
FIG. 1 is a schematic cross-sectional view of a roofing membrane according to one embodiment of the disclosure.

One example of such a roofing membrane is shown in schematic cross-sectional view in FIG. 1. Roofing membrane 100 includes a bituminous sheet 110 having a lower surface 112 and an upper surface 114. In this embodiment, both the lower surface and the upper surface are bituminous. Disposed on at least one of the lower bituminous surface and the upper bituminous surface (in this embodiment, on the lower bituminous surface) is a cold temperature pressure-sensitive adhesive 120. But as will be described in more detail below, roofing membranes of the disclosure may have many different configurations.

Advantageously, the roofing membranes of the present invention possess excellent adhesive properties even at cold temperatures through use of the cold-temperature pressure-sensitive adhesive. A wide variety of cold-temperature pressure sensitive adhesives can be suitable for use in the roofing membranes of the disclosure. As noted above, suitable cold-temperature pressure sensitive adhesives will provide the roofing membrane with an average adhesion at the cold-temperature pressure-sensitive adhesive of at least 8 lbs/ft (117 N/m) at 2° C. as measured by a two hour T-peel test. The two-hour T-peel test is conducted as follows: A 3 inch by 8 inch strip of test sample with a pressure-sensitive adhesive at a surface thereof is provided. The sample is refrigerated at 2° C. overnight prior to testing, wrapped in a plastic bag to prevent condensation. To perform the test, any release liner is removed from the sample, and a masking film is placed at an edge of the strip to leave an unbonded area to initiate the peel. The pressure-sensitive adhesive-bearing surface is applied to a polypropylene sheet (e.g., of a 2-layer roofing membrane having a polypropylene upper layer and a reinforced asphalt lower layer), and a 25 lb roof roller with a five inch dimeter is rolled back and forth three times to adhere the pieces. Test samples are conditioned at 2° C. for two hours, again wrapped in plastic to prevent condensation. T-peel testing is performed using an Instron 3366 system with a 500 N load cell. Cold temperature samples are transported and stored in a foam cooler with cold packs to maintain a cold temperature, and tested in an environmental chamber cooled to 2° C., e.g., using liquid nitrogen. The testing is conducted at a displacement rate of 2 inches/min, which provides a laminate separation rate of 1 inch/min. A minimum of 5 inches of the bonded area is peeled. The peel strength of a sample is determined as the average load and reported as load per unit width (lb/ft).

The person of ordinary skill in the art will select an adhesive with a desired adhesion strength, to provide the roofing membrane with an overall desired adhesion strength at the cold-temperature pressure-sensitive adhesive. In certain embodiments as otherwise described herein, the roofing membrane has an average adhesion at the cold-temperature pressure-sensitive adhesive of at least 10 lbs/ft, e.g., at least 12 lbs/ft, or at least 15 lbs/ft, at 2° C. For example, in certain embodiments, the pressure-sensitive adhesive has an average adhesion of at least 20 lbs/ft, e.g., at least 30 lbs/ft or at least 40 lbs/ft, or at least 50 lbs/ft at 2° C. In certain embodiments as otherwise described herein, the pressure-sensitive adhesive has an average adhesion of no more than 150 lbs/ft at 2° C., e.g., no more than 120 lbs/ft, or no more than 100 lbs/ft, or no more than 80 lbs/ft.

The present inventors have determined that one way to provide a pressure-sensitive adhesive with enhanced adhesion at cold temperatures is the use of an adhesive with a low glass transition temperature ($T_g$). In certain embodiments as otherwise described herein, the cold-temperature pressure-sensitive adhesive has a $T_g$ of no more than 2° C., e.g., no more than 0° C. For example, in certain embodiments, the cold-temperature pressure-sensitive adhesive has a $T_g$ of no more than −5° C., e.g., no more than −10° C. In certain embodiments, the cold-temperature pressure-sensitive adhesive has a $T_g$ of no more than −15° C., e.g., no more than −20° C. As used herein, glass transition temperatures are measured by dynamic mechanical analysis according to ASTM E1356.

A variety of adhesive chemistries can be used in the cold-temperature pressure-sensitive adhesives described herein. However, the present inventors have determined that acrylic-based pressure-sensitive adhesives are especially useful, and thus in certain embodiments as otherwise described herein, the pressure-sensitive adhesive comprises an acrylic polymer. For example, in certain embodiments, the pressure-sensitive adhesive comprises a modified acrylic, a UV acrylic, an aqueous acrylic, or a solvent acrylic. Suitable acrylic monomers may be selected by the person of ordinary skill in the art. Examples of such monomers include butyl acrylate, 2-ethylhexyl acrylate, iso-octyl acrylate, methyl methacrylate, vinyl acetate, and acetic acid. Desirably, the acrylic polymer makes up a significant fraction of the pressure-sensitive adhesive, e.g., at least 50 wt %, at least 65 wt % or at least 80 wt %. For example, in certain embodiments, the acrylic polymer makes up 50-99 wt % of the pressure-sensitive adhesive, e.g., 50-90 wt %, or 50-80 wt %, or 65-99%, or 65-90%, or 80-99%, or 80-95%. Of course, the person of ordinary skill in the art will appreciate that other types of pressure-sensitive adhesives can be used, e.g., pressure-sensitive adhesives based on rubbers (natural or synthetic such as styrene/butadiene block copolymers) and silicones, among others.

Tackifiers are low molecular weight materials that function to increase polymer chain mobility and enhance the compatibility between the adhesive and substrate. In certain embodiments as otherwise described herein, the pressure-sensitive adhesive further comprises a tackifier. Examples of tackifiers suitable for use according to the present disclosure include rosin esters, hydrocarbon resins and terpene resins. The tackifier may be present in the range, e.g., up to 50 wt % of the pressure-sensitive adhesive, e.g., up to 40 wt % or up to 30 wt %. For example, in certain embodiments as otherwise described herein, a tackifier is present in an amount in the range of 0.1 wt % to 50 wt %, or 0.5 wt % to 50 wt %, or 2 wt % to 50 wt %, or 10 wt % to 50 wt %, or 0.1 wt % to 40 wt %, or 0.5 wt % to 40 wt %, or 2 wt % to 40 wt %, or 10 wt % to 40 wt %, or 0.1 wt % to 30 wt %, or 0.5 wt % to 30 wt %, or 2 wt % to 30 wt %, or 10 wt % to 30 wt %.

The pressure-sensitive adhesive may be disposed on the bituminous sheet in a suitable thickness. In certain embodiments as otherwise described herein, the pressure-sensitive adhesive is disposed on the bituminous sheet with a thickness of no more than 500 μm, no more than 400 μm, or no more than 300 μm, or no more than 200 μm. For example, in certain embodiments, the pressure-sensitive adhesive is disposed on the bituminous sheet with a thickness of no more than 150 μm. In certain embodiments as otherwise described herein embodiments, the pressure-sensitive adhesive is disposed on the bituminous sheet with a thickness of no more than 100 μm, or 95 μm, or 90 μm (e.g., 85 μm, 80 μm, or 75 μm). In certain embodiments as otherwise described herein, the pressure-sensitive adhesive is disposed on the bituminous sheet with a thickness of at least 20 μm, or 30 μm, or 40 μm, or 50 μm (e.g., at least 60 μm, or 75 μm, or 80 μm, or 90 μm, or 100 μm). For example, in various embodiments the adhesive has a thickness in the range of 50-200 μm, e.g., 50-150 μm, or 50-125 μm, or 75-200 μm, or 75-150 μm, or 75-125 μm.

The person of ordinary skill in the art will appreciate that a pressure sensitive adhesive can be applied to a bituminous sheet in a variety of ways. For example, a cold-temperature pressure-sensitive adhesive may be provided in tape form, with a release liner protecting the surface that is not adhered to the bituminous surface. Such tapes can, for example, be disposed on the bituminous surface by the supplier (e.g., in factory setting), or may be applied at the point of installation by the installer. Pressure-sensitive adhesive materials can also be provided in bulk form, e.g., as a solution, suspension, or emulsion in water or organic solvents, or as a melt. When provided in bulk form, the adhesive may be first spread onto a transfer film and then transferred to the bituminous sheet. In certain embodiments as otherwise described herein, the pressure-sensitive adhesive is not a hot melt adhesive.

And in many embodiments, the cold-temperature pressure-sensitive adhesive is applied first to the substrate surface to which the bituminous surface is to be adhered. For example, the cold-temperature pressure-sensitive adhesive can first be applied to a roof deck or to a base sheet disposed on a roof deck, or to another roofing membrane. If present, a release liner on the pressure-sensitive adhesive opposite the roof deck or base sheet is removed. Then the bituminous surface is adhered to the roof deck or base sheet.

As the person of ordinary skill in the art will appreciate, release liners can be used to protect otherwise adhesive substances during manufacturing, transport, storage and initial installation steps; the release liner can be removed by an installer at an appropriate time when it is desired to adhere the adhesive substance. Further, release liners may also act as transfer tapes during manufacture, whereby the pressure-sensitive adhesive is coated onto the transfer tape, then applied to the bituminous sheet. Accordingly, in certain embodiments as otherwise described herein, the roofing membrane further comprises one or more release liners, disposed on one or more of the pressure-sensitive adhesive and any otherwise exposed bituminous surface. The release liner may be formed of coated paper, or polymers such as silicone, polypropylene, polyethylene terephthalate, or polyethylene. In the embodiment of FIG. 1, release liners 150 are disposed on the pressure-sensitive adhesive 120 and on the upper bituminous surface 114 at the selvage edge 140.

The person of ordinary skill in the art will appreciate that a wide variety of bituminous sheets generally known in the art are suitable for use in the membranes and methods of the present disclosure. Such bituminous sheets are typically manufactured in continuous processes in which a continuous sheet of a reinforcing material, such as felt, fiberglass, paper or polyester, is immersed in a bath of hot, fluid bituminous coating material so that the bituminous material saturates the substrate sheet and coats at least one side of the substrate. In the example of FIG. 1, a reinforcing sheet 116 is saturated and coated on both sides with bituminous material 118. The sheet can be provided as a rolled product in a long strip of standard width.

The bituminous material used in manufacturing the roofing products according to the present invention may be derived from a petroleum processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, oils, flame-retardant materials, stabilizing materials, anti-static compounds, and the like. Preferably, the total amount by weight of such modifying ingredients is not more than about 15 percent of the total weight of the bituminous material. The bituminous material may also include amorphous polyolefins, up to about 25 percent by weight. Examples of suitable amorphous polyolefins include atactic polypropylene and ethylene-propylene rubber. The bituminous composition may also include a suitable filler, such as calcium carbonate, talc, carbon black, stone dust, or fly ash, preferably in an amount from about 10 percent to 70 percent by weight of the bituminous material.

The bituminous material can be coated on sides not meant for adhesion to other surfaces with a protective material such as a suitable mineral powder, sand or granular material. In the example of FIG. 1, mineral granules 130 are adhered to part of the top bituminous surface, leaving a selvage edge 140 as exposed bituminous material. Roofing granules can be disposed on an upper bituminous surface of the bituminous sheet, e.g., where the surface is to be exposed when installed. Roofing granules are well known in the art and may have enhanced properties such as high solar reflectance or algaecidal properties. The roofing granules may be in the form of coated base particles. The base particles employed are preferably mineral particles suitable for roofing applications, and may be substantially round or have a plate-like or flake-like geometry. The base particles may be stone dust produced as a by-product of quarrying, stone crushing, or machining operations. In particular, dust from talc, slag, limestone, granite, marble, syenite, diabase, Greystone, quartz, slate, trap rock, basalt, greenstone, andesite, porphyry, rhyolite, and marine shells may be used, as well as manufactured or recycled materials such as ceramic grog, proppants, crushed bricks, concrete, porcelain, fire clay, and the like. Ceramic materials, such as silicon carbide and aluminum oxide of suitable dimensions can also be used. Preferably, the base particles may be silica deficient in order to have good UV opacity.

The roofing granules may have a coating applied to them, wherein the coating includes a binder and optionally one or more pigment. The binder may include feldspars, an alkali silicate such as sodium silicate, a clay, such as kaolin or other aluminosilicate clays, Dover clay, or bentonite clay, or combinations thereof. The pigment may include titanium dioxide, metal pigments, titanates, mirrorized silica pigments, and IR-reflective pigments. Suitable roofing granules include those disclosed in U.S. Pat. Nos. 7,241,500 and 8,865,303, each of which is hereby incorporated herein by reference in its entirety.

As noted above, a reinforcing sheet may be embedded within the bituminous sheet to provide a substrate for the bituminous material and to impart increased mechanical strength. For example, in certain embodiments as otherwise described herein, the bituminous sheet further comprises a reinforcing sheet embedded within the bituminous sheet. For example, the bituminous sheet may further comprise a reinforcing sheet comprised of fiberglass, polyester, felt, paper, or a combination thereof.

The reinforcing sheet may serve to effectively separate the bituminous sheet into an upper asphalt composition and lower asphalt composition. Thus, in such embodiments the bituminous sheet comprises an upper asphalt composition disposed on an upper surface of the reinforcing sheet and a lower asphalt composition disposed on a lower surface of the reinforcing sheet. In certain embodiments as otherwise described herein, the upper asphalt composition and lower asphalt composition are not substantially the same. In other embodiments, the upper asphalt composition and lower asphalt composition are substantially identical.

The roofing membranes of the disclosure may be configured in a variety of manners, depending on their desired ultimate installation. In certain embodiments as otherwise described herein, and as shown in FIG. 1, the pressure-sensitive adhesive is disposed on a lower bituminous surface of the bituminous sheet. A pressure-sensitive adhesive disposed on the lower bituminous surface of the bituminous sheet can provide for adhesion during installation of the roofing membrane to an underlying substrate (e.g., a roof deck or another sheet of material disposed thereon) even at cold temperatures.

In certain embodiments as otherwise described herein, and as shown in FIG. 1, the pressure-sensitive adhesive is disposed on substantially the entire lower bituminous surface of the bituminous sheet. In such embodiments, the pressure-sensitive adhesive alone can provide the adhesion to the underlying substrate.

Figure 2:
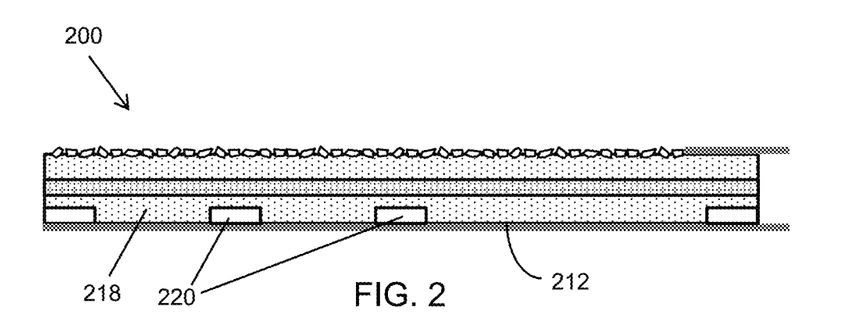
FIG. 2 is a schematic cross-sectional view of a roofing membrane according to another embodiment of the disclosure.

However, in other embodiments as otherwise described herein, the pressure-sensitive adhesive is not disposed on the entire lower bituminous surface of the bituminous sheet, such that a bituminous lower surface of the bituminous sheet remains exposable on at least a portion of the lower surface of the roofing membrane. Such a sheet is shown in schematic cross-sectional view in FIG. 2. Here, in roofing membrane 200 there are strips of pressure-sensitive adhesive 220 disposed at the lower bituminous surface 212. But bituminous material 218 remains substantially exposable where there is no pressure-sensitive adhesive. Thus, when installed both the pressure-sensitive and the bituminous lower surface of the bituminous sheet will contact the substrate. Advantageously, this can allow the bitumen to act as an adhesive when ambient temperatures are sufficient to allow it to be adhesive. When installed at cold temperature, only the portions of the roofing membrane having the pressure-sensitive adhesive disposed thereon will be strongly adhered to the substrate during the time immediately after installation; this can be sufficient until the weather warms enough to allow full bonding. In such embodiments, the pressure-sensitive adhesive can optionally be formed into recesses in the lower surface of the bituminous sheet, so as to present a uniform surface for bonding. However, when the pressure-sensitive adhesive is sufficiently thin, this may not be necessary. In certain embodiments as otherwise described herein, the pressure-sensitive adhesive is provided at a fractional area of the lower surface of the bituminous sheet in the range of at least 5%, e.g., at least 10%, at least 25% or at least 50%. In certain embodiments as otherwise described herein, the pressure-sensitive adhesive is provided at a fractional area of the lower surface of the bituminous sheet in the range of 5-95%, e.g., 10-95%, or 25-95%, or 50-95%, or 5-75%, or 10-75%, or 25-75%, or 50-75%, or 5-50%, or 10-50%, or 25-50%.

In order to promote efficient use of the pressure sensitive adhesive, in certain embodiments as otherwise described herein, the pressure-sensitive adhesive is disposed at least one edge of a lower bituminous surface of the bituminous sheet. For example, in certain embodiments, the pressure-sensitive adhesive is disposed at only one edge of a lower bituminous surface of the bituminous sheet. In other embodiments, the pressure-sensitive adhesive is disposed at two, three, or four edges of the lower bituminous surface of the bituminous sheet. In certain embodiments as otherwise described herein, the pressure-sensitive adhesive present on the lower surface is only disposed within 30 cm (e.g., 25 cm, or 20 cm, or 15 cm, or 10 cm) of an edge of the roofing membrane. In certain such embodiments, the adhesive extends to one or more edges of the roofing membrane.

It may also be advantageous to provide the pressure-sensitive adhesive on an upper bituminous surface of the bituminous sheet. This approach allows an additional adhesive surface for the installation of overlapping membranes. Additionally, the pressure-sensitive adhesive may be disposed on the upper bituminous surface of the bituminous sheet to allow adhesion, particularly in cold temperatures, to an additional finishing product, such as gravel, shingles, or an additional membrane, place on top of the roofing membrane.

Figure 3:
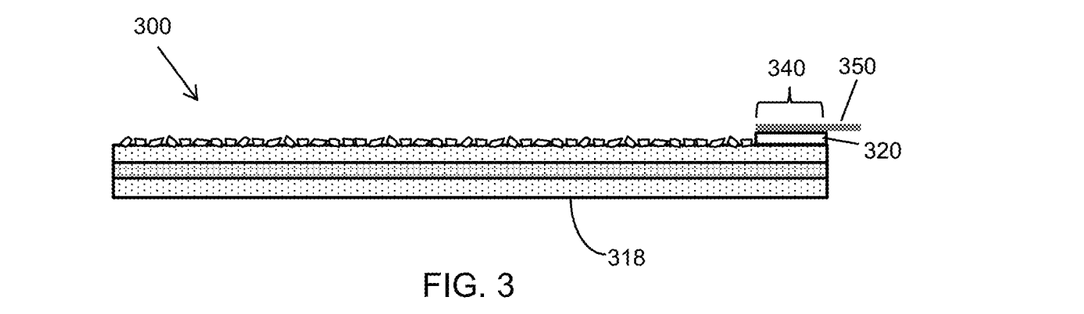
FIG. 3 is a schematic cross-sectional view of a roofing membrane according to another embodiment of the disclosure.

Accordingly, in certain embodiments as otherwise described herein, a pressure-sensitive adhesive is disposed on an upper bituminous surface of the bituminous sheet. For example, as shown in FIG. 3, the pressure-sensitive adhesive may be disposed at at least one edge of an upper bituminous surface of the bituminous sheet. For example, in certain embodiments, the pressure-sensitive adhesive is disposed only one edge of an upper bituminous surface of the bituminous sheet. Here, in roofing membrane 300 Bituminous material 318 remains substantially exposed at the lower surface of the bituminous sheet. In the selvage edge 340 at the edge of the upper surface of the bituminous sheet, a cold-temperature pressure-sensitive adhesive 320 is provided with a release liner 350. This can be useful when overlapping adjacent membranes next to one another to cover the width of a roof. In other embodiments, the pressure-sensitive adhesive is disposed at two, three, or four edges of the upper bituminous surface of the bituminous sheet. In certain embodiments as otherwise described herein, the pressure-sensitive adhesive present on the upper bituminous surface is only disposed within 30 cm (e.g., 25 cm, or 20 cm, or 15 cm, or 10 cm) of an edge of the roofing membrane. In certain such embodiments, the adhesive extends to one or more edges of the roofing membrane. In cases where pressure-sensitive adhesive is provided only at one or more edges of the upper surface of the bituminous sheet, the remainder of the upper bituminous surface of the bituminous sheet can be substantially surfaced, e.g., with roofing granules or other particulate material, as shown in FIG. 3.

Figure 4:
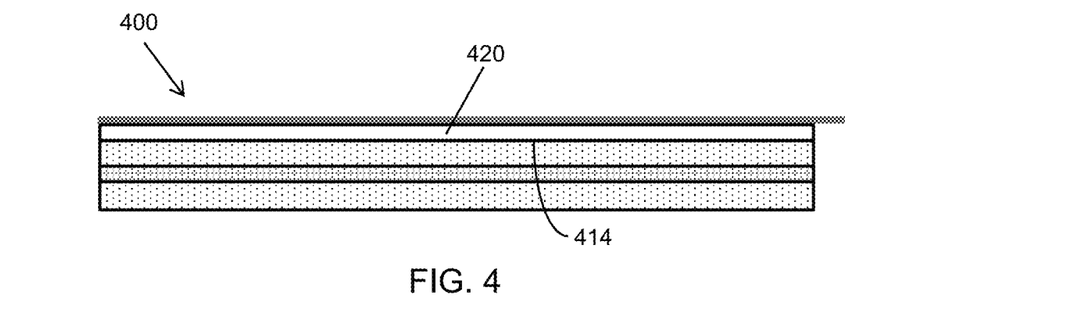
FIG. 4 is a schematic cross-sectional view of a roofing membrane according to another embodiment of the disclosure.

In other embodiments, the pressure-sensitive adhesive is disposed on substantially the entire upper surface of the bituminous sheet. In such embodiments, the pressure-sensitive adhesive alone can provide adhesion to an overlying sheet or other material. Such an embodiment is shown in FIG. 4. Here, roofing membrane 400 includes a pressure-sensitive adhesive 420 disposed on an upper bituminous surface 414 of the bituminous sheet. This roofing membrane is suitable, e.g., as a base layer for the adhesion of an overlying layer. Here, there is no pressure-sensitive adhesive on the lower surface of the bituminous sheet; when installed it can be tacked to a substrate such as a roof deck with nails to hold it in place; in some embodiments later warm weather can improve adhesion of the lower bituminous surface to the substrate.

However, in other embodiments as otherwise described herein, the pressure-sensitive adhesive is not disposed on the entire upper bituminous surface of the bituminous sheet, such that a bituminous upper surface of the bituminous sheet remains exposable on at least a portion of the lower surface of the roofing membrane. This can be analogous to the structure shown in schematic cross-sectional view in FIG. 2. Thus, when installed, both the pressure-sensitive and the bituminous upper surface of the bituminous sheet will contact an overlying sheet or other material. Advantageously, this can allow the bitumen to act as an adhesive when ambient temperatures are sufficient to allow it to be adhesive. When installed at cold temperature, only the portions of the roofing membrane having the pressure-sensitive adhesive disposed thereon will be strongly adhered to the overlying sheet or other material during the time immediately after installation; this can be sufficient until the weather warms enough to allow full bonding. In such embodiments, the pressure-sensitive adhesive can optionally be formed into recesses in the upper surface of the bituminous sheet, so as to present a uniform surface for bonding. However, when the pressure-sensitive adhesive is sufficiently thin, this may not be necessary. In certain embodiments as otherwise described herein, the pressure-sensitive adhesive is provided at a fractional area of the upper surface of the bituminous sheet in the range of at least 5%, e.g., at least 10%, at least 25% or at least 50%. In certain embodiments as otherwise described herein, the pressure-sensitive adhesive is provided at a fractional area of the upper surface of the bituminous sheet in the range of 5-95%, e.g., 10-95%, or 25-95%, or 50-95%, or 5-75%, or 10-75%, or 25-75%, or 50-75%, or 5-50%, or 10-50%, or 25-50%.

While the pressure-sensitive adhesives described herein can be used to bond to a variety of materials, the present inventors have determined that bonding to a material with a high surface energy increases the adhesion of the pressure-sensitive adhesive. Accordingly, in certain embodiments as otherwise described herein, a roofing membrane as otherwise described herein has a surface layer having a surface energy of at least 30 mN/m (e.g., at least 35 mN/m, or at least 40 mN/m, or at least 50 mN/m). The surface layer can be provided as a layer adhered (e.g., during manufacture) to a bituminous surface of the bituminous sheet, e.g., an upper bituminous surface. This can allow for bonding of another membrane through its own pressure-sensitive adhesive to the surface layer. And in certain embodiments of the methods and roofing systems as described below, a roofing membrane as otherwise described herein can be bound to a surface having a high surface energy (e.g., at least 30 mN/m or other value as described above) through its pressure-sensitive adhesive. Such a material can be provided, e.g., as a nail-down underlayment, or another self-adhesive membrane of the disclosure. In order to provide high surface energies, the present inventors have determined that treated polymer films have exceptional characteristics. Accordingly, in certain embodiments as otherwise described herein, the surface layer comprises a corona-treated polymer, e.g., polyethylene terephthalate. In other embodiments, the surface layer may comprise polypropylene/ethyl-vinyl acetate blends, polypropylene/acrylic blends, or could be replaced completely by other polymers (e.g., PET, PVC, or nylon). Of course, the person of ordinary skill in the art can use surfaces of lower surface energy. In fact, the adhesives described herein can be provided to have good adhesion to lower surface energy materials, such as polypropylene.

The roofing membranes as described herein may be used in a variety of manners, depending on their construction. For example, in certain embodiments the roofing membranes as used herein can be provided as a base sheet. In general, base sheets are utilized to bond directly to the unfinished roof (e.g., to plywood or cement). Base sheets may be provided as a roll good, and installed in overlapping or non-overlapping strips. A base sheet may be further covered with a paint or other coating (e.g., a solar-reflective coating, a colored or decorative coating, or a waterproof coating). A base sheet may also or alternatively be covered with a cap sheet, e.g., provided as a roll good and installed to cover the base sheet; in such cases a pressure-sensitive adhesive on the base sheet, on the cap sheet, or both may adhere them to one another.

In certain embodiments, the roofing membranes as disclosed herein can be used as a cap sheet. Typically, cap sheets are installed over base sheets and form an upper surface of a roofing system. A cap sheet is desirably bonded to an underlying base sheet, e.g., via a pressure-sensitive adhesive provided on the base sheet, on the cap sheet, or both. Cap sheets may be installed as precut sections or in overlapping strips. In certain embodiments as otherwise described herein, a roofing membrane used as a cap sheet further comprises roofing granules disposed on at least a portion of the upper surface of the bituminous sheet. For example, the roofing granules may be disposed on any part of the upper surface that is not to be overlapped by an adjacent membrane.

Another aspect of the disclosure is a roofing system comprising one or more roofing membranes as described herein, disposed on a roof, and adhered to a substrate (e.g., a roof deck, a roofing base sheet or another roofing membrane) or a superstrate (e.g., a roofing membrane) by the pressure-sensitive adhesive. As the person of ordinary skill in the art will appreciate from the present disclosure, such systems can take many forms.

Figure 5:
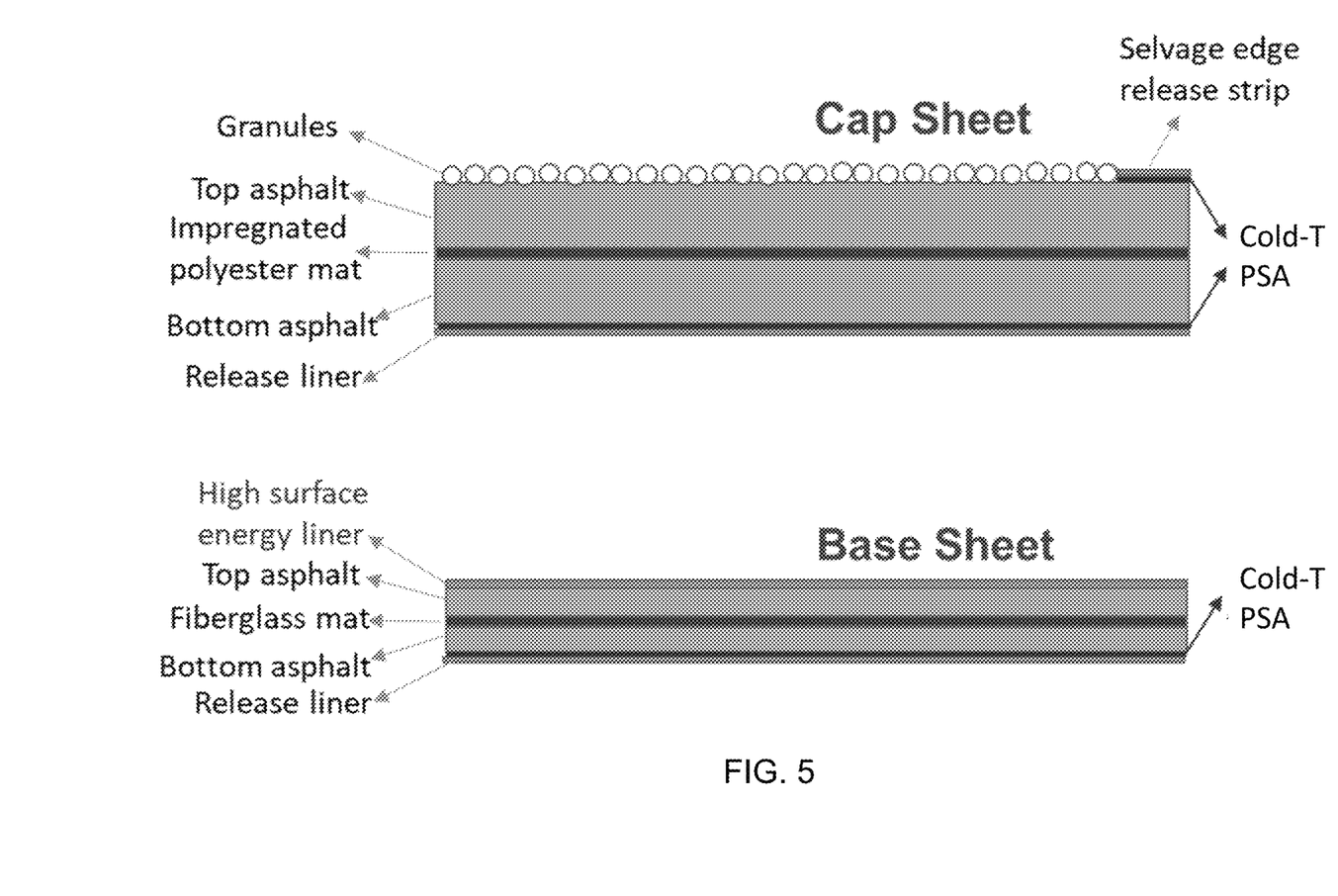
FIG. 5 is a schematic cross-sectional view of a cap sheet and a base sheet according to one embodiment of the disclosure.

An example of a cap sheet and a base sheet for installation together in a roofing system of the disclosure are shown in schematic cross-sectional view in FIG. 5. Here, the base sheet has a cold-temperature pressure-sensitive adhesive disposed at the lower bituminous surface of its bituminous (i.e., asphalt) sheet, and a polymer layer disposed at the upper bituminous surface of its bituminous sheet. This polymer layer can be a high-surface energy layer as described herein and as indicated in FIG. 5, or alternatively can be of another material, e.g., polypropylene. The cap layer has a cold-temperature pressure-sensitive adhesive disposed at the lower bituminous surface of its bituminous (i.e., asphalt) sheet, roofing granules disposed at the upper bituminous surface of its bituminous sheet, but for one edge where there is exposable cold-temperature pressure-sensitive adhesive covered by a release liner. When installed, the release liners are removed, and the base sheet is adhered to a roof deck through the cold-temperature pressure-sensitive adhesive. The cap sheet is adhered by its cold-temperature pressure-sensitive adhesive to the base sheet; as described above, use of the high surface energy layer can improve adhesion. Adjacent cap sheets overlap one another edge to edge, with the cold-temperature pressure-sensitive adhesive at the lower surface of an overlapping membrane adhering to the cold-temperature pressure-sensitive adhesive at the selvage edge of an underlying membrane. As an alternative, the pressure-sensitive adhesive can be omitted from the upper surface at the selvage edge of the cap sheet; the liner can protect an uncoated bituminous surface, which can adhere to an edge of an overlapping cap sheet by the cold-temperature pressure-sensitive adhesive at the lower surface thereof.

Figure 6:
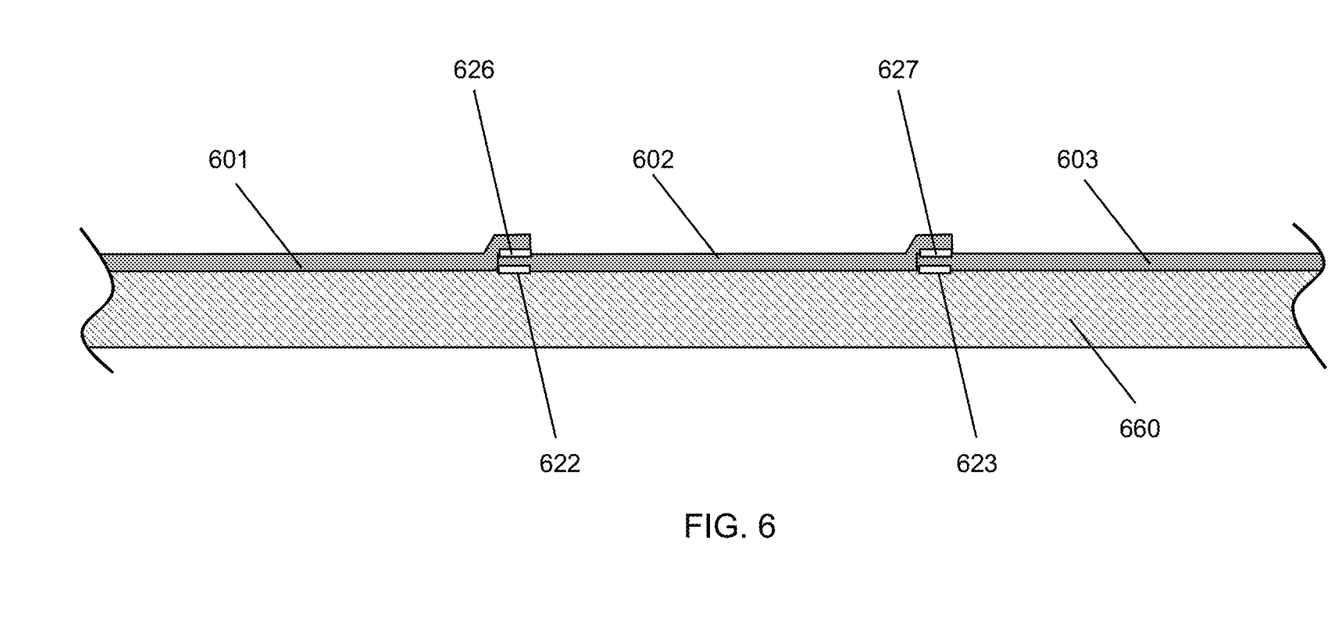
FIG. 6 is a schematic cross-sectional view of a roofing system according to one embodiment of the disclosure.

Another example of a roofing system is shown in FIG. 6. Here, adjacent roofing membranes 601, 602 and 603 are overlapped as shown. Each roofing membrane is adhered at its left edge to the roof deck 660 by a strip of cold-temperature pressure-sensitive adhesive on its lower bituminous surface (622, 623) and at its right edge to the underlapping membrane to its right by a strip of cold-temperature pressure-sensitive adhesive on its lower bituminous surface (626, 627). As described in more detail below, the pressure-sensitive adhesive can be applied at the time of installation in the form of a tape. In such cases, the pressure-sensitive adhesive 626 and 627 can alternatively be considered to be on the top surface of the respective membranes 601 and 602.

The roofing membranes according to the present disclosure may be advantageously installed onto a variety of substrates. Accordingly, an aspect of the present disclosure is a method of installing a roofing membrane, the method comprising: providing a first roofing membrane (e.g., a roofing membrane as otherwise described herein); and adhering the first the roofing membrane to a substrate or to a superstrate. The substrate may be any suitable substrate as known in the art, such as an uncoated roof, plywood, cement, a roofing base sheet, a roofing membrane, or old roofing material. The first roofing membrane can be adhered (additionally or alternatively) to a superstrate, such as an overlapping roofing membrane.

After installing the first roofing membrane, a second roofing membrane of the disclosure can be installed. Thus, in certain embodiments as otherwise described herein, the method further comprises providing a second roofing membrane (e.g., a roofing membrane as otherwise described herein); and adhering the second roofing membrane so as to at least partially overlap the first roofing membrane, wherein a pressure-sensitive adhesive disposed at the lower surface of the second roofing membrane is adhered to the first roofing membrane. The method can also include providing a second roofing membrane (e.g., a roofing membrane as otherwise described herein); and adhering the second roofing membrane so as to at least partially overlap the first roofing membrane, wherein a pressure-sensitive adhesive disposed at the upper surface of the first roofing membrane is adhered to the second roofing membrane.

In particular embodiments as otherwise described herein, the method further comprises applying pressure to first membrane and/or the second membrane to put pressure on the pressure-sensitive adhesive(s), i.e., where the first membrane is adhered to an underlying substrate and/or in the overlapped area of the first roofing membrane and the second roofing membrane. A roof roller can be used for application of pressure; the person of ordinary skill in the art will appreciate that other ways of applying pressure may be suitable.

Advantageously, the roofing membranes according to the present disclosure possess good adhesive properties at cold temperature (see Examples). This serves to extend the temperature window in which the roofing membrane may be installed. Accordingly, in certain embodiments as otherwise described herein, the adhering of the roofing membrane(s) is performed at a temperature of no more than 50° F. (10° C.), e.g., no more than 45° F. (7.2° C.), or no more than 40° F. (4.4° C.). In certain embodiments as otherwise described herein, the adhering of the roofing membrane(s) is performed at a temperature of no more than 35° F. (1.7° C.), e.g., no more than 30 F. Of course, the person of ordinary skill in the art will appreciate that for any adhesive there will be a temperature at which it will no longer provide adhesion; the minimum installation temperature can be determined based on the characteristics of the adhesive. Desirably, the installation temperature is greater than the Tg of the cold-temperature pressure-sensitive adhesive (e.g., by at least 2° C., by at least 5° C., or by at least 10° C.). In certain embodiments as otherwise described herein, the adhering is performed at a temperature of at least 0° F., e.g., at least 5° F., at least 10° F., at least 15° F., or at least 20° F.

As described above, while the pressure-sensitive adhesive may be applied to a bituminous sheet in a manufacturing environment, this need not be the case. The present inventors have noted that pressure-sensitive adhesives, especially in tape form, can be conveniently applied to roofing membranes while in the field. This allows for the installer to decide at the time of installation whether use of a cold-temperature pressure-sensitive adhesive is desirable based on local weather conditions on the day. Thus, the skilled person may use otherwise conventional roofing membranes until temperatures fall below the minimum installation temperature required by those conventional roofing membranes. Then, the conventional roofing membranes may be modified by the application of the pressure-sensitive adhesive of the present disclosure to allow installation to occur, even at cold temperatures. Similarly, a manufacturer need not provide separate cold-temperature version of its products; rather a single version of each product may be provided, with the option of a cold-temperature pressure-sensitive adhesive tape.

Accordingly, another aspect of the disclosure is a kit, comprising a cold-temperature pressure-sensitive adhesive in the form of a tape; and one or more bituminous sheets having one or more exposable bituminous surfaces, the pressure-sensitive adhesive being affixable to a bituminous surface of a bituminous sheet to provide a roofing membrane having an average adhesion at the cold-temperature pressure-sensitive adhesive of at least 8 lbs/ft (117 N/m) at 2° C. as measured by a two hour T-peel test. The bituminous sheets and the roofing membranes provided by affixing the pressure-sensitive adhesive thereto may be as otherwise described herein (i.e., without the pressure-sensitive adhesives, and optionally with release liners covering any otherwise-exposed bituminous surfaces).

An additional aspect of the present disclosure is a method of installing a roofing system, the method comprising:
providing a roofing membrane, the roofing membrane having a bituminous sheet having an upper surface and a lower surface, at least one of the upper and lower surfaces being bituminous;
affixing a first surface of a cold-temperature pressure-sensitive adhesive (e.g., as described herein) to a bituminous surface of the roofing membrane such that an opposed second surface of the cold-temperature pressure-sensitive adhesive remains exposable; and
adhering the roofing membrane to a roofing substrate, to a base sheet, or to another roofing membrane via the second surface of the cold-temperature pressure-sensitive adhesive.

In another aspect, the present disclosure provides for a method of installing a roofing system, the method comprising:
providing a bituminous sheet having an upper surface and a lower surface, at least one of the upper and lower surfaces being bituminous;
providing a cold-temperature pressure-sensitive adhesive (e.g., as described herein) having a first surface an opposed second surface;
affixing a second surface of the cold-temperature pressure-sensitive adhesive to a substrate (e.g., a roof deck, a roofing base sheet, or a roofing membrane) or a superstrate (e.g., another roofing membrane), such that an opposed first surface of the cold-temperature pressure-sensitive adhesive remains exposable; and
adhering the first surface of the cold-temperature pressure-sensitive adhesive to a bituminous surface of the bituminous sheet, to provide a roofing membrane having an average adhesion at the cold-temperature pressure-sensitive adhesive of at least 8 lbs/ft (117 N/m) at 2° C. as measured by a two-hour T-peel test.

These processes may advantageously be performed at the site at which the membrane is to be installed. For example, this process may conveniently be performed while on a roof surface; the membrane can be unrolled roughly into position on the roof, the cold-temperature pressure-sensitive adhesive can be applied thereto, any release liner on the opposed second surface of the cold-temperature pressure-sensitive adhesive can removed, and the membrane can be installed. The pressure-sensitive adhesive can be provided, e.g., as a rolled strip, unrolled for use like a tape. When the pressure-sensitive adhesive is to be installed between roofing membranes, it can be applied to the overlapping membrane or the underlapping membrane.

These processes can be performed as described above with respect to the installation methods above, e.g., at cold temperatures, such as any of the temperatures as described above.

The pressure-sensitive adhesive may be provided in any convenient form to facilitate transport and installation. For example, in certain embodiments as otherwise described herein, the pressure-sensitive adhesive may be provided as a strip or a rolled strip, or may be provided as sheets or patches. In particular embodiments, the pressure-sensitive adhesive is provided with a release liner (e.g., a low energy release liner) disposed on at least one side of the pressure-sensitive adhesive. For example, the release liner may be then removed prior to installation.

EXAMPLES

Sample Preparation

Prototypes were prepared according to ASTM D1970 for self-adhering roofing underlayment, Section 7.4. Specifically, 3 inch by 8 inch strips were cut from a bituminous sheet. UV acrylics were draw-down coated on a silicone double side release liner with a dry thickness around 3-4 mil, to provide an adhesive transfer tape. Adhesive transfer tapes were applied directly onto the asphalt surface of the cut pieces. A 25 lb roof roller was passed back and forth twice over the transfer tape to maximize contact between the adhesive and the asphalt. The silicone double-sided coated release liner was left in place until the piece was used to prepare a test sample. When the release liner was peeled back, the adhesive remained on the asphalt.

T-Peel Testing

T-peel testing was conducted to evaluate the adhesion between prototypes to a conventional bituminous base. Prototype samples were refrigerated at 35° F. overnight prior to testing. During refrigeration, the samples were wrapped tightly in a plastic bag to prevent condensation water build-up on surfaces. T-peel test samples were then prepared by adhering prototypes to the top liner surface of a conventional polypropylene-lined bituminous base sheet using the following steps:

(1) The release liner was removed from the prototype to reveal the adhesive. A masking film was placed on the outer edge of the adhesive, which left an unbonded area to initiate a peel.

(2) The prototype was then applied to the top film of the base sheet. A 25 lb roof roller with a diameter of 5 inches was passed back and forth three times to tightly adhere the two pieces.

(3) Prepared test samples were conditioned at 35° F. for a two-hour period prior to testing. Samples were wrapped tightly in a plastic bad to prevent build-up of condensation.

Figure 7:
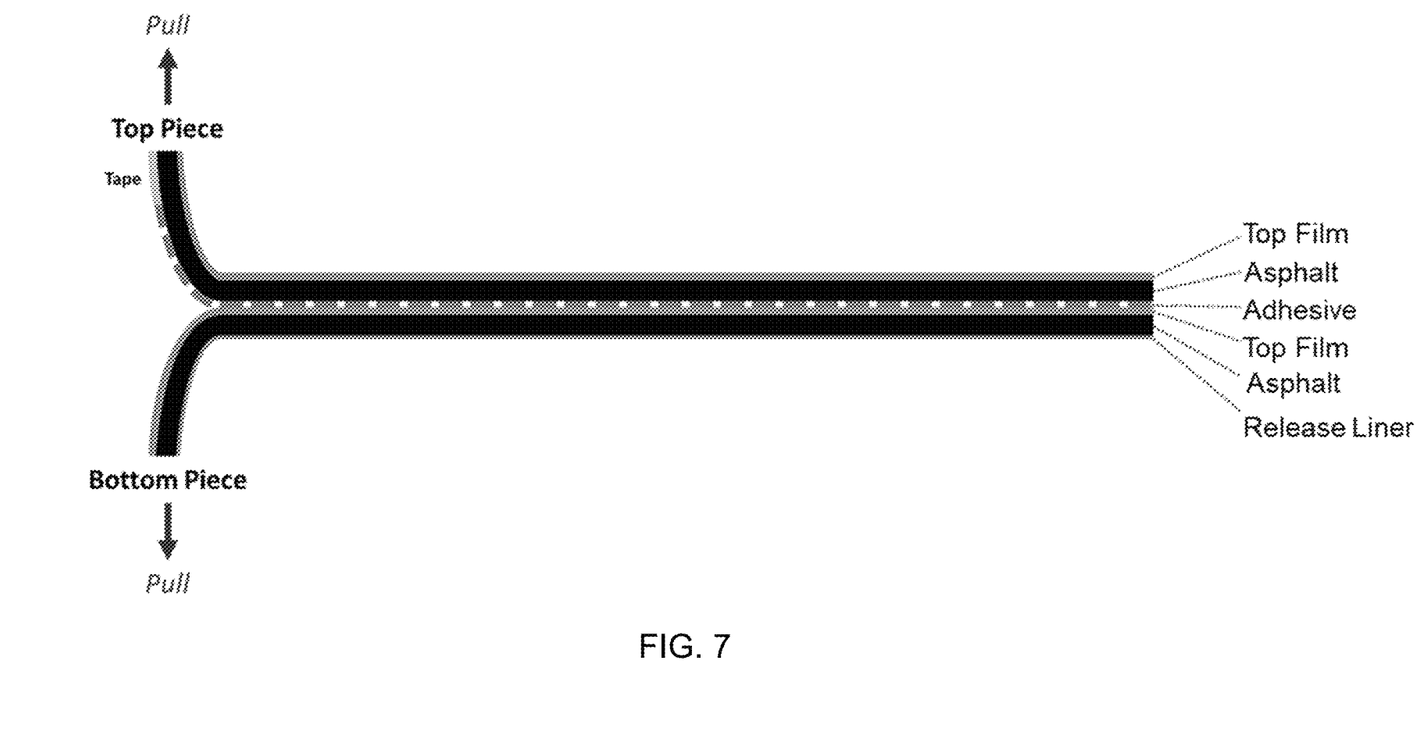
FIG. 7 is a schematic view of the T-peel test used in the examples of the present disclosure.

A schematic cross-sectional view of the T-peel testing is shown in FIG. 7.

For T-peel testing conducted at room temperature, the samples were prepared similarly except there was no conditioning prior to sample preparation, and the 2-hour dwell was at ambient temperature.

T-peel testing was performed using an Instron 3366 mechanical testing system with a 500 N load cell. Screw action grips were used to hold test samples. Control samples were tested at ambient conditions. Cold temperature samples were transported and stored in a foam cooler with cold packs to maintain a cold temperature, and tested in an environmental chamber cooled to 1-2° C. using liquid nitrogen. T-peel testing was conducted at a displacement rate of 2 in/min, which provided a laminate separation rate of 1 in./min. A minimum of 5 inches of the bonded area was peeled. The peel strength of a sample was determined as the average load and reported as load per unit width (lb/ft).

Example 1: Testing of Conventional Roofing Membrane

Figure 8:
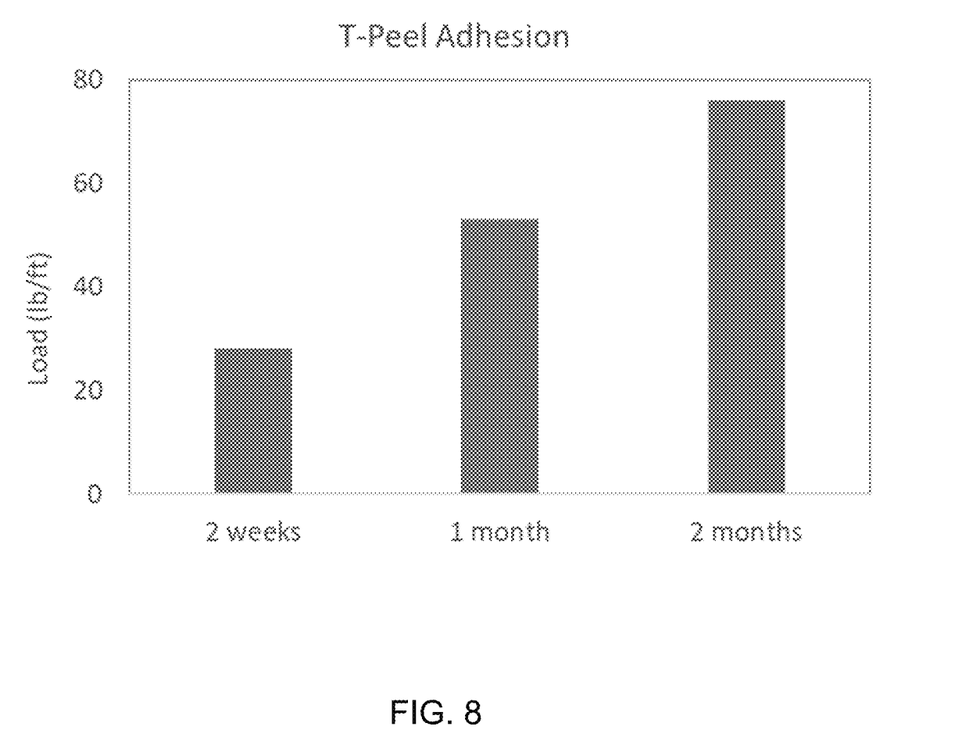
FIG. 8 is a graph of adhesion strength over time according to an example embodiment.

A conventional roofing membrane was subjected to T-peel testing at room temperature, 40° C., and 35° C. As expected, there was a distinct temperature dependence, with an average 2-hour T-peel adhesion at 35° F. of only approximately 3 lbs/ft, as compared to an average 2-hour T-peel adhesion at 40° F. of 10 lbs/ft, and at room temperature of 60 lbs/ft. The results are shown in FIG. 8. This loss of adhesive strength at cold temperature is unsurprising, as asphalt typically requires a substrate temperature of at least 50° F. Below this temperature, asphalt cannot wet out the substrate, causing a sharp decline in bonding strength.

Example 2: Biolink® 80 HX and 130 HX Acrylic Tapes

Commercial tape samples were evaluated (from Biolink®). Acrylic based adhesive tapes sold under the designations 80 HX and 130 HX were found to be promising. The 2-hour T-peel test of these two adhesives at 35° F. and ambient temperature were measured, where 80 HX displayed adhesions of 15 lbs/ft and 50 lbs/ft at 35° F. and ambient temperature, respectively, and 130 HX displayed adhesions of 20 lbs/ft and 80 lbs/ft at 35° F. and ambient temperature, respectively.

Example 3: High Energy Base Sheet Liner

Polypropylene is used as a conventional surface layer for asphalt base sheets. Polypropylene has a low surface energy of about 28 mN/m. This low surface energy can make the liner difficult to wet out, and thus difficult to adhere to in some circumstances. Thus, it was hypothesized that a high surface energy surface layer could increase the bonding of the pressure-sensitive adhesive, for example between a base sheet and cap sheet.

To test this hypothesis, a corona-treated polyethylene film was prepared with a surface energy of approximately 53 mN/m, and an acrylic pressure-sensitive adhesive was selected as a representative pressure-sensitive adhesive. Using this on top of the bituminous sheet instead of the conventional polypropylene material resulted in a 2-hour T-peel adhesion at 35° F. and ambient temperature of 30 lbs/ft and 50 lbs/ft, both significantly higher than the corresponding values found using the conventional material. Of course, the values demonstrated above for a polypropylene material can be sufficient to provide the desired performance, and so use of a higher-surface energy material is not necessary.

Example 4: Aging Performance of Transfer Tape

In order to study the effect of asphalt aging on the bond between an acrylic adhesive and asphalt, a transfer tape using an acrylic adhesive was laminated onto the bottom asphalt of a bituminous cap sheet and then bonded to the selvage area of the base sheet, thus providing direct bonding between asphalt and the acrylic. This was subjected to accelerated aging at 70° C.

Surprisingly, the bond strength was found to increase over time (FIG. 8). The T-peel adhesion was approximately 30 lbs/ft at ambient temperature for the first two weeks. After one month, the T-peel adhesion increased to approximately 50 lbs/ft, and after two months it further increased to approximately 80 lbs/ft with an observed failure mode of cohesive asphalt failure.

Additional embodiments of the disclosure are described by the following enumerated embodiments, which can be combined in any number and in any combination not technically or logically inconsistent.

Embodiment 1. A roofing membrane comprising:
a bituminous sheet having a lower surface and an upper surface, at least one of the upper and lower surfaces being bituminous; and
a non-bituminous cold-temperature pressure-sensitive adhesive disposed on the lower bituminous surface, the upper bituminous surface, or both, wherein the roofing membrane has an average adhesion at the cold-temperature pressure-sensitive adhesive of at least 8 lbs/ft (117 N/m) at 2° C. as measured by a two hour T-peel test.

Embodiment 2. The roofing membrane of embodiment 1, wherein the roofing membrane has an average adhesion of at least 10 lbs/ft (146 N/m) at 2° C. as measured by the two hour T-peel test.

Embodiment 3. The roofing membrane of embodiment 1, wherein the roofing membrane has an average adhesion of at least 20 lbs/ft (292 N/m) at 2° C. as measured by the two hour T-peel test.

Embodiment 4. The roofing membrane of any of embodiments 1-3, wherein the pressure-sensitive adhesive has an average adhesion no more than 120 lbs/ft (1751 N/m) at 2° C., e.g., no more than 100 lbs/ft or no more than 80 lbs/ft, as measured by the two hour T-peel test.

Embodiment 5. The roofing membrane of any of embodiments 1-4, wherein the pressure-sensitive adhesive has a $T_g$ no more than 2° C., e.g., no more than 0° C., or no more than −5° C.

Embodiment 6. The roofing membrane of any of embodiments 1-4, wherein the pressure-sensitive adhesive has a $T_g$ no more than −10° C., e.g., no more than −15° C., or no more than −20° C.

Embodiment 7. The roofing membrane of any of embodiments 1-6, wherein the pressure-sensitive adhesive comprises an acrylic polymer, e.g., present in an amount in the range of at least 50 wt % of the pressure-sensitive adhesive.

Embodiment 8. The roofing membrane of any of embodiments 1-7, wherein the pressure-sensitive adhesive comprises at least one tackifier, e.g., wherein the tackifier is present in the range of 2 wt % to 40 wt % of the pressure-sensitive adhesive.

Embodiment 9. The roofing membrane of any embodiments 1-8, wherein the pressure-sensitive adhesive is not a hot melt adhesive.

Embodiment 10. The roofing membrane of any of embodiments 1-9, wherein the pressure-sensitive adhesive has a thickness of no more than 400 µm.

Embodiment 11. The roofing membrane of any of embodiments 1-9, wherein the pressure-sensitive adhesive has a thickness in the range of 50-150 µm.

Embodiment 12. The roofing membrane of any of embodiments 1-11, further comprising one or more release liners, disposed on one or more of the pressure-sensitive adhesive and any otherwise exposed bituminous surface.

Embodiment 13. The roofing membrane of any of embodiments 1-12, further comprising a reinforcing sheet embedded within the bituminous sheet (e.g., a fiberglass reinforcing sheet, or a polyester mat reinforcing sheet).

Embodiment 14. The roofing membrane of embodiment 13, wherein the bituminous sheet comprises an upper asphalt composition disposed on an upper surface of the reinforcing sheet and a lower asphalt composition disposed on a lower surface of the reinforcing sheet, wherein the upper asphalt composition and the lower asphalt composition are not substantially the same.

Embodiment 15. The roofing membrane of any of embodiments 1-14, further comprising roofing granules disposed on at least a portion of an upper bituminous surface of the bituminous sheet.

Embodiment 16. The roofing membrane of any of embodiments 1-15, wherein the pressure-sensitive adhesive is disposed on a lower bituminous surface of the bituminous sheet.

Embodiment 17. The roofing membrane of embodiment 16, wherein the pressure-sensitive adhesive is disposed on substantially the entire lower bituminous surface of the bituminous sheet.

Embodiment 18. The roofing membrane of embodiment 16, wherein the pressure-sensitive adhesive is not disposed on the entire lower bituminous surface of the bituminous sheet, such that a bituminous lower surface of the bituminous sheet remains exposable on at least a portion of the lower surface of the roofing membrane.

Embodiment 19. The roofing membrane of embodiment 17, wherein the pressure-sensitive adhesive is provided at a fractional area of the lower surface of the bituminous sheet in the range of 5-95%, e.g., 10-95%, or 25-95%, or 50-95%, or 5-75%, or 10-75%, or 25-75%, or 50-75%, or 5-50%, or 10-50%, or 25-50%.

Embodiment 20. The roofing membrane of any of embodiments 1-16, 18 and 19, wherein the pressure-sensitive adhesive is disposed at at least one edge of a lower bituminous surface of the bituminous sheet (e.g., on one, two, three, or four edges, or around the perimeter thereof).

Embodiment 21. The roofing membrane of any of embodiments 1-16 and 18-20, wherein the pressure-sensitive adhesive present on the lower bituminous surface is only disposed within 30 cm (e.g., 25 cm, or 20 cm) of the roofing membrane edge.

Embodiment 22. The roofing membrane of any of embodiments 1-21, wherein a pressure-sensitive adhesive is disposed on an upper bituminous surface of the bituminous sheet.

Embodiment 23. The roofing membrane of embodiment 22, wherein the pressure-sensitive adhesive is not disposed on the entire upper surface of the bituminous sheet.

Embodiment 24. The roofing membrane of embodiment 23, wherein a bituminous lower surface of the bituminous sheet remains exposable on at least a portion of the upper surface of the roofing membrane.

Embodiment 25. The roofing membrane of embodiment 23 or embodiment 24, wherein the pressure-sensitive adhesive is provided at a fractional area of the upper surface of the bituminous sheet in the range of 5-95%, e.g., 10-95%, or 25-95%, or 50-95%, or 5-75%, or 10-75%, or 25-75%, or 50-75%, or 5-50%, or 10-50%, or 25-50%.

Embodiment 26. The roofing membrane of embodiment 22, wherein the pressure-sensitive adhesive is disposed on substantially the entire upper bituminous surface of the bituminous sheet.

Embodiment 27. The roofing membrane of any of embodiments 1-26, further comprising a release liner disposed on the bituminous sheet, wherein the release liner has a surface energy of at least 30 mN/m (e.g., at least 25 mN/m, or at least 40 mN/m, or at least 50 mN/m).

Embodiment 28. The roofing membrane of embodiment 27, wherein the release liner comprises polyethylene terephthalate (e.g., corona-treated polyethylene terephthalate).

Embodiment 29. A roofing system comprising one or more roofing membranes according to any of embodiments 1-28, disposed on a roof, and adhered to a substrate (e.g., a roof deck, a roofing base sheet or another roofing membrane) or a superstrate (e.g., a roofing membrane) by the pressure-sensitive adhesive.

Embodiment 30. The roofing system of embodiment 29, comprising two roofing membranes, overlapped such that a pressure-sensitive adhesive of an underlapping roofing membrane adheres an overlapping roofing membrane.

Embodiment 31. The roofing system of embodiment 29, comprising two roofing membranes, overlapped such that a pressure-sensitive adhesive of an overlapping roofing membrane adheres an underlapping roofing membrane.

Embodiment 32. A method of installing a roofing membrane, the method comprising:
providing a first roofing membrane (e.g., the roofing membrane of any of embodiments 1-28); and
adhering the first roofing membrane to a substrate (e.g., roof deck, or a roofing base sheet) or to a superstrate (e.g., another roofing membrane) via the pressure-sensitive adhesive.

Embodiment 33. The method of embodiment 32, further comprising:
providing a second roofing membrane (e.g., the roofing membrane of any of embodiments 1-28); and
adhering the second roofing membrane so as to at least partially overlap the first roofing membrane, wherein a pressure-sensitive adhesive disposed at the lower surface of the second roofing membrane is adhered to the first roofing membrane.

Embodiment 34. The method of embodiment 32, further comprising:
providing a second roofing membrane (e.g., the roofing membrane of any of embodiments 1-28); and adhering the second roofing membrane so as to at least partially overlap the first roofing membrane, wherein a pressure-sensitive adhesive disposed at the upper surface of the first roofing membrane is adhered to the second roofing membrane.

Embodiment 35. The method of embodiments 32-34, further comprising applying pressure to the first membrane and/or the second membrane to put pressure on the pressure-sensitive adhesive(s).

Embodiment 36. The method of any of embodiments 32-35, wherein the adhering is performed at a temperature of no more than 50° F. (10° C.), e.g., no more than 45° F. (7.2° C.), or no more than 40° F. (4.4° C.).

Embodiment 37. The method of any of embodiments 32-35, wherein the adhering is performed at temperature of no more than 35° F. (1.7° C.), e.g., no more than 30 F (−1.1° C.).

Embodiment 38. The method of any of embodiments 32-37, wherein the adhering is performed at a temperature of at least 20° F. (−6.7° C.).

Embodiment 39. A method of installing a roofing system (e.g., according to any of embodiments 29-31), the method comprising:
providing a bituminous sheet having an upper surface and a lower surface, at least one of the upper and lower surfaces being bituminous;
affixing a first surface of a cold-temperature pressure-sensitive adhesive (e.g., as described herein) to a bituminous surface of the roofing membrane such that an opposed second surface of the cold-temperature pressure-sensitive adhesive remains exposable, thereby providing a roofing membrane having an average adhesion at the cold-temperature pressure-sensitive adhesive of at least 10 lbs/ft (146 N/m) at 2° C. as measured by a two hour T-peel test; and
adhering the roofing membrane to a roofing substrate, to a base sheet, or to another roofing membrane via the second surface of the cold-temperature pressure-sensitive adhesive.

Embodiment 40. A method of installing a roofing system, the method comprising:
providing a bituminous sheet having an upper surface and a lower surface, at least one of the upper and lower surfaces being bituminous;
providing a cold-temperature pressure-sensitive adhesive (e.g., as described herein) having a first surface an opposed second surface;
affixing a second surface of the cold-temperature pressure-sensitive adhesive to a substrate (e.g., a roof deck, a roofing base sheet, or a roofing membrane) or a superstrate (e.g., another roofing membrane), such that an opposed first surface of the cold-temperature pressure-sensitive adhesive remains exposable; and
adhering the first surface of the cold-temperature pressure-sensitive adhesive to a bituminous surface of the bituminous sheet, to provide a roofing membrane having an average adhesion at the cold-temperature pressure-sensitive adhesive of at least 8 lbs/ft (117 N/m) at 2° C. as measured by a two-hour T-peel test.

Embodiment 41. The method of embodiment 39 or embodiment 40, wherein the pressure-sensitive adhesive is provided as a strip, (e.g., a rolled strip).

Embodiment 42. The method of any of embodiments 39-41, performed at the site at which the roofing system is to be installed.

Embodiment 43 The method of any of embodiments 39-41, performed on the roof on which the roofing system is to be installed.

Embodiment 44. The method of any of embodiments 39-43, wherein the adhering is performed at a temperature of no more than 50° F. (10° C.), e.g., no more than 45° F. (7.2° C.), or no more than 40° F. (4.4° C.).

Embodiment 45. The method of any of embodiments 39-43, wherein the adhering is performed at temperature of no more than 35° F. (1.7° C.), e.g., no more than 30 F (−1.1° C.).

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A roofing membrane comprising:
a bituminous sheet having a lower bituminous surface providing a bottom surface of the roofing membrane and an upper bituminous surface providing an top surface of the roofing membrane; and
a non-bituminous cold-temperature pressure-sensitive adhesive disposed on the lower bituminous surface, the upper bituminous surface, or both, wherein the roofing membrane has an average adhesion at the cold-temperature pressure-sensitive adhesive of at least 8 lbs/ft (117 N/m) at 2° C. as measured by a two hour T-peel test.

2. The roofing membrane of claim 1, wherein the roofing membrane has an average adhesion at the cold-temperature pressure-sensitive adhesive of at least 20 lbs/ft (292 N/m) at 2° C. as measured by the two hour T-peel test.

3. The roofing membrane of claim 2, wherein the roofing membrane has an average adhesion at the cold-temperature pressure-sensitive adhesive no more than 120 lbs/ft (1751 N/m) at 2° C., as measured by the two hour T-peel test.

4. The roofing membrane of claim 1, wherein the pressure-sensitive adhesive has a Tg no more than −10° C.

5. The roofing membrane of claim 1, wherein the pressure-sensitive adhesive comprises an acrylic polymer present in an amount in the range of at least 50 wt % of the pressure-sensitive adhesive.

6. The roofing membrane of claim 1, wherein the pressure-sensitive adhesive has a thickness in the range of 50-150 μm.

7. The roofing membrane of claim 1, further comprising one or more release liners, disposed on one or more of the pressure-sensitive adhesive and any otherwise exposed bituminous surface.

8. The roofing membrane of claim 1, further comprising a reinforcing sheet embedded within the bituminous sheet.

9. The roofing membrane of claim 8, wherein the bituminous sheet comprises an upper asphalt composition disposed on an upper surface of the reinforcing sheet and a lower asphalt composition disposed on a lower surface of the reinforcing sheet, wherein the upper asphalt composition and the lower asphalt composition are not substantially the same.

10. The roofing membrane of claim 1, wherein the pressure-sensitive adhesive is disposed on a lower bituminous surface of the bituminous sheet.

11. The roofing membrane of claim 10, wherein the pressure-sensitive adhesive is disposed on substantially the entire lower bituminous surface of the bituminous sheet.

12. The roofing membrane of claim 10, wherein the pressure-sensitive adhesive is not disposed on the entire lower bituminous surface of the bituminous sheet, such that a bituminous lower surface of the bituminous sheet remains exposable on at least a portion of the lower surface of the roofing membrane.

13. The roofing membrane of claim 12, wherein the pressure-sensitive adhesive is provided at a fractional area of the lower surface of the bituminous sheet in the range of 5-50%.

14. A roofing system comprising a first roofing membrane according to claim 10, disposed on a roof having a roof deck, and adhered to the roof deck or to a base sheet disposed on the roof deck by contact with the pressure-sensitive adhesive of the first roofing membrane and by contact with a bituminous material disposed at the lower bituminous surface of the first roofing membrane.

15. The roofing system of claim 14, further comprising a second roofing membrane having a lower surface, the lower surface of the second roofing membrane being adhered to the first roofing membrane by contact of the lower surface of the second roofing membrane and the upper bituminous surface of the first roofing membrane with the second non-bituminous cold-temperature pressure-sensitive adhesive, wherein the roofing membrane has an average adhesion at the second cold-temperature pressure-sensitive adhesive of at least 8 lbs/ft (117 N/m) at 2° C. as measured by a two hour T-peel test.

16. The roofing membrane of claim 1, wherein the pressure-sensitive adhesive is disposed at at least one edge of a lower bituminous surface of the bituminous sheet.

17. The roofing membrane of claim 1, wherein the pressure-sensitive adhesive present on the lower bituminous surface is only disposed within 20 cm of the roofing membrane edge.

18. The roofing membrane of claim 1, wherein a pressure-sensitive adhesive is disposed on an upper bituminous surface of the bituminous sheet, wherein the pressure-sensitive adhesive is not disposed on the entire upper surface of the bituminous sheet.

19. A roofing system comprising one or more roofing membranes according to claim 1, disposed on a roof, and adhered to a substrate or a superstrate by the pressure-sensitive adhesive.

20. A method of installing a roofing membrane, the method comprising:
providing a first roofing membrane according to claim 1, and
adhering the first roofing membrane to a substrate or to a superstrate via the pressure-sensitive adhesive.

21. A method of installing a roofing system according to claim 19, the method comprising:
providing a bituminous sheet having an upper surface and a lower surface, at least one of the upper and lower surfaces being bituminous;
affixing a first surface of a cold-temperature pressure-sensitive adhesive (e.g., as described herein) to a bituminous surface of the roofing membrane such that an opposed second surface of the cold-temperature pressure-sensitive adhesive remains exposable, thereby providing a roofing membrane having an average adhesion at the cold-temperature pressure-sensitive adhesive of at least 10 lbs/ft (146 N/m) at 2° C. as measured by a two hour T-peel test; and
adhering the roofing membrane to a roofing substrate, to a base sheet, or to another roofing membrane via the second surface of the cold-temperature pressure-sensitive adhesive.

22. A method of installing a roofing system, the method comprising:
providing a bituminous sheet having an upper surface and a lower surface, at least one of the upper and lower surfaces being bituminous;
providing a cold-temperature pressure-sensitive adhesive (e.g., as described herein) having a first surface an opposed second surface;
affixing a second surface of the cold-temperature pressure-sensitive adhesive to a substrate (e.g., a roof deck, a roofing base sheet, or a roofing membrane) or a superstrate (e.g., another roofing membrane), such that an opposed first surface of the cold-temperature pressure-sensitive adhesive remains exposable; and
adhering the first surface of the cold-temperature pressure-sensitive adhesive to a bituminous surface of the bituminous sheet, to provide a roofing membrane having an average adhesion at the cold-temperature pressure-sensitive adhesive of at least 8 lbs/ft (117 N/m) at 2° C. as measured by a two-hour T-peel test.

* * * * *